United States Patent
Prabhudesai et al.

(10) Patent No.: US 7,680,909 B2
(45) Date of Patent: Mar. 16, 2010

(54) METHOD FOR CONFIGURATION OF A PROCESSING UNIT

(75) Inventors: Shantanu Prasad Prabhudesai, Bangalore (IN); Satheesh Sadanand, Bangalore (IN)

(73) Assignee: Ittiam Systems (P) Ltd., Bangalore, Kamataka (IN)

( * ) Notice: Subject to any disclaimer, the term of this patent is extended or adjusted under 35 U.S.C. 154(b) by 285 days.

(21) Appl. No.: 11/688,884

(22) Filed: Mar. 21, 2007

(65) Prior Publication Data
US 2008/0256348 A1    Oct. 16, 2008

(51) Int. Cl.
G06F 15/177 (2006.01)
G06F 9/00 (2006.01)
G06F 13/00 (2006.01)
G06F 9/44 (2006.01)
G06F 7/38 (2006.01)

(52) U.S. Cl. .......................... 709/220; 713/1; 711/105; 711/125; 717/135; 718/102; 712/245; 709/215

(58) Field of Classification Search ......... 709/212–228; 713/1; 711/105, 125; 717/135; 718/102; 712/245
See application file for complete search history.

(56) References Cited

U.S. PATENT DOCUMENTS

| | | | | |
|---|---|---|---|---|
| 5,875,293 A | * | 2/1999 | Bell et al. ..................... | 714/27 |
| 6,876,561 B2 | * | 4/2005 | Wolrich et al. ............... | 711/125 |
| 7,111,296 B2 | * | 9/2006 | Wolrich et al. ............... | 718/102 |
| 7,191,321 B2 | * | 3/2007 | Bernstein et al. ............ | 712/245 |
| 2005/0149665 A1 | * | 7/2005 | Wolrich et al. ............... | 711/105 |
| 2007/0234310 A1 | * | 10/2007 | Zhang et al. ................. | 717/135 |
| 2008/0256348 A1 | * | 10/2008 | Prasad et al. .................. | 713/1 |

* cited by examiner

Primary Examiner—Haresh N Patel
(74) Attorney, Agent, or Firm—Prakash Nama; Global IP Services, PLLC

(57) ABSTRACT

A method for configuration of an Auxiliary Processing Unit (APU) of multiprocessor system is presented. The multiprocessor system has at least a Main Processing Unit (MPU) coupled to the APU via a communication link. The APU has at least a first memory and a second memory. The method includes a plurality of steps. At step the first memory is divided into an application sector, a boot sector and a common sector. At another step interrupts of the APU except interrupt/s that is/are being received via the communication link are disabled. At a further step interrupt vector/s pertaining to the communication link is/are mapped to the boot sector of the first memory. At another step a configuration code is received selectively into the application sector of the first memory and into the second memory. At a further step the interrupt/s that is/are being received via the communication link are disabled. At a further step the common sector of the first memory is updated from the second memory.

12 Claims, 4 Drawing Sheets

METHOD FOR CONFIGURATION OF A PROCESSING UNIT

FIELD OF INVENTION

The invention relates to a method of configuration of a processing unit, more specifically the invention relates to a method for configuration of a processing unit in a multiprocessor system.

BACKGROUND

A multiprocessor system (hereinafter "system") includes a number of processing units. For configuring these units, a communication link, with each unit, capable of interacting with resources external to the multiprocessor system is required. Often extra real estate on silicon is required to provide these communication links. In many cases, not all the processing units of the system are required to interact with the resources external to the system. In such cases, the sole purpose of the communication link remains limited to configuration of the processing unit. Providing for a communication link on the silicon for a single purpose is not only area inefficient but also, expensive affair.

Moreover, upgradation of these systems may involve updating of on board memory where the non-volatile code resides. This updating of on board memory may result in loss and/or alteration of data that may be required by the processing unit which is being upgraded.

Therefore, such systems are difficult to reconfigure for new functionalities and require use of sophisticated programming techniques, like JTAG (Joint Test Action Group), spy Bi-ware, Universal Asynchronous Receiver Transmitter (UART) based programming etc.

In a typical example, when the processing unit is a microcontroller, size of onboard memory may present constraints to the upgradation process. In addition, handling of interrupts may be a difficult task while reconfiguration/upgradation of the microcontroller. These complexities generally make it difficult for an end user to reconfigure or upgrade the processing unit and invoke requirement of a service person to handle the matter.

SUMMARY

In one aspect, a method for configuration of an Auxiliary Processing Unit (APU) of multiprocessor system, the multiprocessor system having at least a Main Processing Unit (MPU) coupled to the APU via a communication link, the APU has at least a first memory and a second memory. The method includes the steps of: dividing the first memory into an application sector, a boot sector and a common sector; disabling interrupts of the APU except interrupt/s pertaining to the communication link; mapping interrupt vector/s pertaining to the communication link to the boot sector of the first memory; receiving selectively a configuration code into the application sector of the first memory and into the second memory; disabling the interrupt/s pertaining to the communication link; and updating the common sector of the first memory.

The APU may be a microcontroller or a microprocessor. Also, the MPU may be a microprocessor or a microcontroller.

The first memory may be included within the APU or it may be an external memory usable by the APU.

The second memory may be included within the APU or the second memory may be an external memory usable by the APU or it may be a scratchpad memory.

The method may also include the step of updating that may erase contents of the common sector of the first memory and/or copy contents of the second memory into the common sector of the first memory.

The method may further include the step of receiving selectively that may receive part of the configuring code pertaining to the application sector of the first memory into the application sector of the first memory and/or may receive part of the configuration code pertaining to the common sector of the first memory into the second memory.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION OF FIGURES

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

A system and method for configuration of an Auxiliary Processing Unit (APU) in a multi-processor system is disclosed. The multiprocessor system includes a Main Processing Unit (MPU) coupled to the APU using a communication link. In the following description, for the purposes of explanation, numerous specific details are set forth in order to provide a thorough understanding of the various embodiments. It will be evident, however to one skilled in the art that other embodiments may be practiced without departing from the scope of the subject matter.

Figure 1:
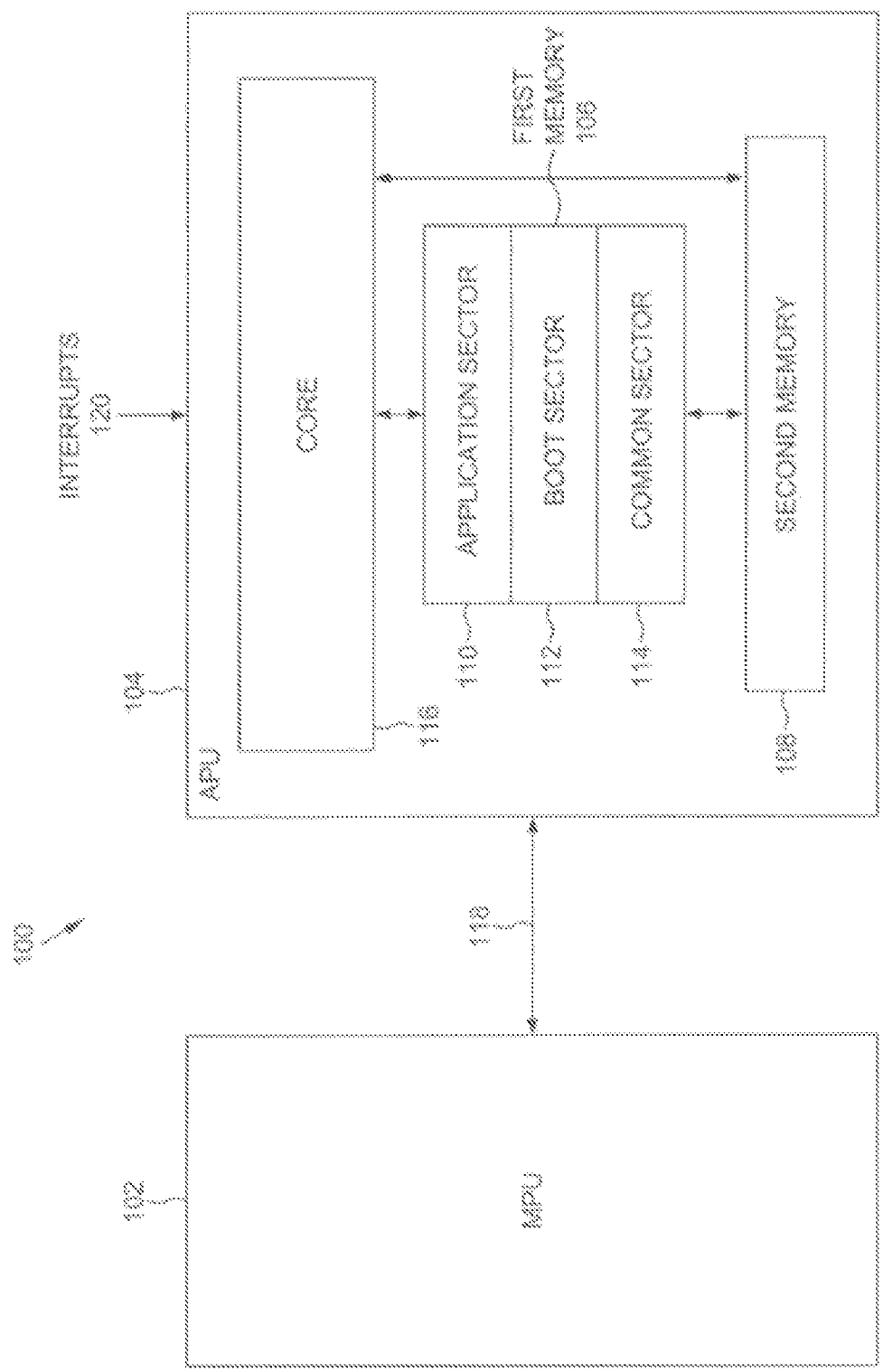
FIG. 1 is an example multiprocessor system.

FIG. 1 shows a multiprocessor system 100. The system having an APU 104 and an MPU 102 coupled to one another via a communication link 118. The APU 104 may have a core 116 which may include various processing and controlling elements (not shown). The core 116 may perform activities such as, arithmetic, logical, peripheral interface functions and servicing of interrupts. The interrupt may be an electrical signal from a peripheral, e.g., remote control commands, Personal System/2 (PS/2) keyboard key presses, touch screen input etc., to the processor and/or an interrupt may arise among processors. The interrupts may also occur from internal sources of the APU, such as, timer, direct memory access etc. When the peripheral asserts this signal, an interrupt is said to occur. When an interrupt occurs, the current context is saved and an interrupt service routine is executed. When the interrupt service routine exits, control of the processor is returned to original context. Also, the relevant information processed by the APU during interrupt service routine or otherwise may be passed on to the main processor, on demand. The core also takes care of other functionalities like power control, Real Time Clocks, and/or sensors.

The APU 104 further includes a first memory 106 which may be logically divided into an application sector 110, a boot sector 112 and a common sector 114. The boot sector 112 may contain code for reconfiguring contains of the first memory 106. The first memory 106 is the memory that will contain the configuration data at the end of the configuration process. The APU 104 may also include a second memory 108. The second memory may be a scratchpad or an unused part of the application sector or a reserved memory. The first memory 106 and/or the second memory 108 or any combination thereof may be present within the APU 104 or may be external to the APU 104. The first memory 108 and the second memory 108 may be controlled by the core 116. The contents of the first memory 106 and the second memory 108 may be swapped. The APU 104 may also have one or more interrupts 120 other than the interrupts pertaining to the communication link 118.

The APU 104 may be a microcontroller or a microprocessor. The MPU 102 may be a microcontroller or a microprocessor. The MPU 102 may have a link that may access resources external to the multiprocessor system 100. The APU 104 and the MPU 102 may have component that interprets computer program instructions and processes data; it may also interface a number of peripheral devices. The method according to present subject matter may be implemented in above multiprocessor system. A person skilled in the art will appreciate that the system explained in the above discussion is just a possible system amongst many other. The method of the present subject matter may also be implemented in the systems that may not have the features described above.

Figure 2:
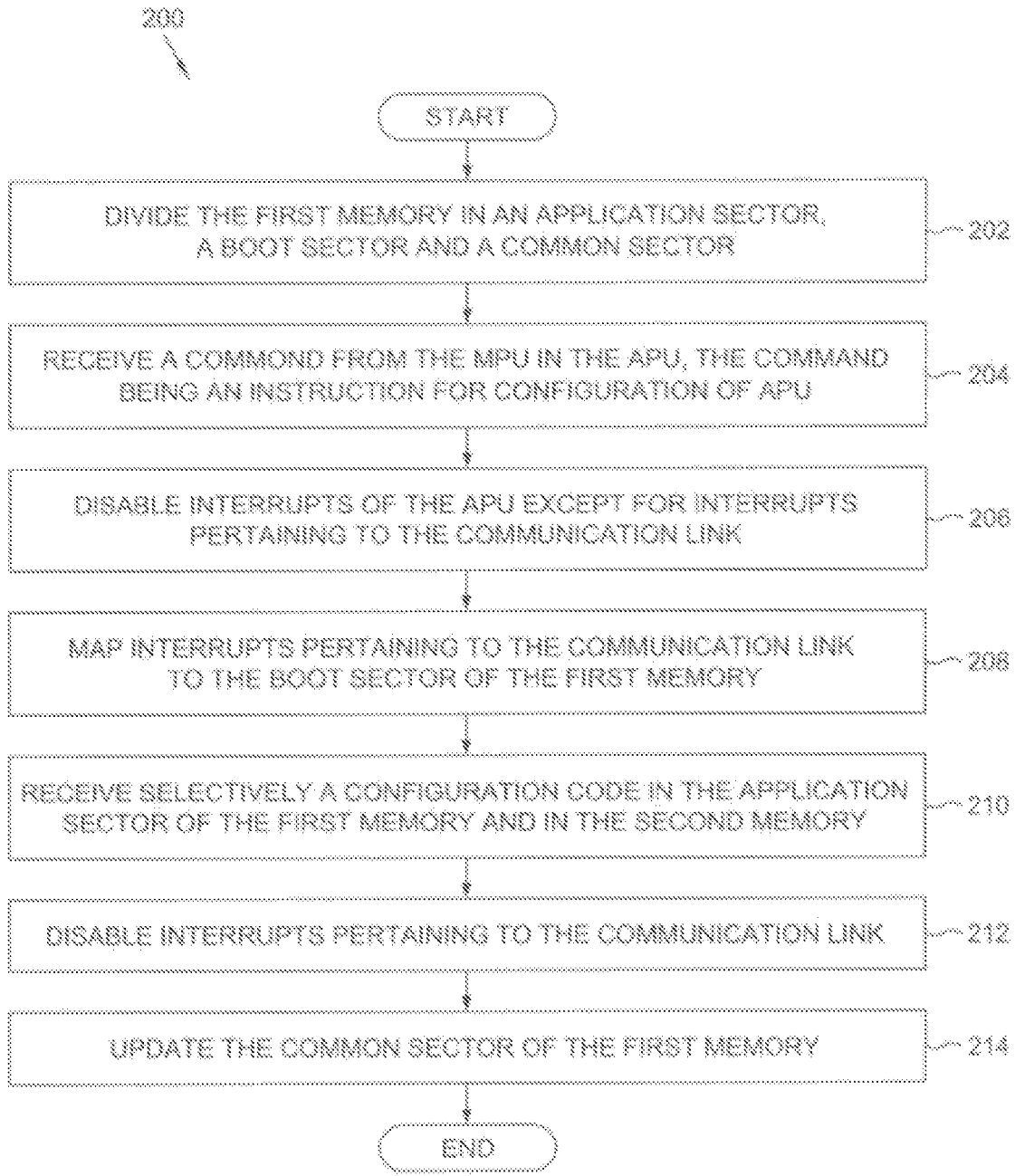
FIG. 2 is a flow diagram of an embodiment of a method in accordance with the present subject matter.

FIG. 2 is a flow diagram 200 of an embodiment of a method in accordance with the present subject matter. The method 200 may be implemented in a multiprocessor system. The multiprocessor system may have a Main Processing Unit (MPU) and an Auxiliary Processing Unit (APU). The MPU and APU may be coupled to one another by a communication link. The APU may have a first memory and a second memory. The second memory may be an unused part of the first memory or a separate memory. According to the method, at step 202 the first memory may be logically divided into three sectors namely, an application sector, a boot sector and a common sector.

The multiprocessor system may be configured to receive or generate a command. The command may be an instruction for initiating steps for configuration of the APU. The command may be generated by the MPU. Alternatively the command may be generated by any other unit (including the APU itself) of the multiprocessor system. The command may be received by the APU via the communication link from MPU or through other interfaces coupled to the APU. The communication link may be any link such as, I2C (Inter Integrated Circuits), SPI (Serial Peripheral Interface) etc. The command code may be an executable code that may perform a specific task. At step 204 the command may be received by the APU. At step 206 the interrupts, other than the interrupts pertaining to the communication link, which are being received by the APU, are disabled. At step 208 the interrupts pertaining to the communication link are mapped onto the boot sector of the first memory. At step 210 a configuration code is received by the APU. The configuration code may be generated in the form of a binary file by a software compiler and/or is transferred to the MPU and may be stored in a memory associated with or accessible to the MPU. The configuration code may be selectively received by the APU via communication link. The selection for receiving the configuration code may be made according to the parts of the code that meant for residing in different section of the memory. A part of the code pertaining to the application sector of the first memory may be received directly into the application sector of the first memory. Reception of this code may be done bit by bit or byte by byte or at any other rate. On the other hand a part of the code pertaining to the common sector of the memory may be received in the second memory. Receiving configuration code selectively offers advantages of controllability of the APU during the configuration process by allowing some of the interrupts functional during receiving process of the configuration code. These advantages are discussed later. Once the configuration code has been received, at step 212 the interrupts pertaining to the communication link may also be disabled and at step 214 the first memory may be updated to include both the parts of the configuration code. The step 214 may include step of erasing contents of the common sector of the first memory and a step of copying contents of the second memory into the common sector of the first memory. Normal operation of the APU may be resumed subsequently.

Figure 3:
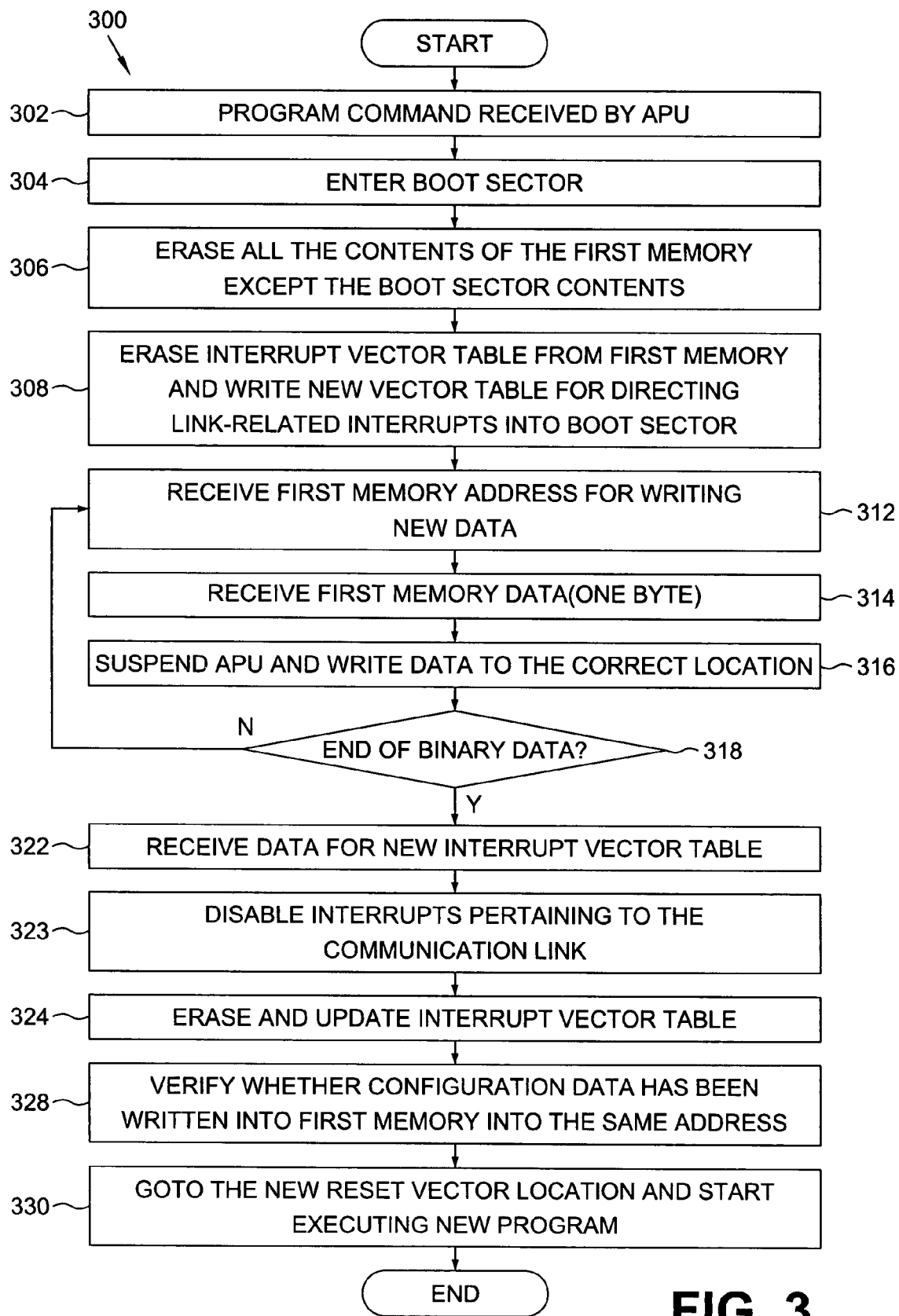
FIG. 3 is a flow diagram of another embodiment of a method in accordance with the present subject matter.

According to one example of the method 300 depicted in FIG. 3, a binary code that is required to be stored in the first memory of the APU may be generated in the form of a ".out" file using a compiler. During the process of configuration of the APU this file may be stored in a memory associated with the MPU or a memory accessible to the MPU. The ".out" file may be made accessible to the MPU by transferring or streaming it over the Ethernet/wireless local area network or placing it in storage devices associated with the MPU. This file may also be stored in a memory (buffers) of the MPU. The APU, which generally includes a controller that may be used to modify or write data in the first memory, may be used for configuration of the APU.

According to this implementation of the invention, at step 302, a command is received by the APU either from the MPU or from external interface or by manual intervention. The command may also be generated by the APU on receipt of a trigger to generate such command. The trigger may be received by one of the above sources. The command may include a set of instructions for transferring specific information related to user interfaces, between the MPU and the APU. One example of the command may be the "PROGRAM" command which is a proprietary of the applicant. This command may be received by the APU via the communications link. On receipt of the command the APU suspends normal operations and starts executing a boot loader routine at step 304. The boot loader routine is a routine that initiates configuration process of the APU. The boot loader routine may be made to reside in a dedicated segment of the first memory of the APU or it may also reside in the Read Only Memory (ROM)/One Time Programmable (OTP) regions (if the manufacturer of the APU can give such a provision). Letting the boot loader routine reside into any of above mentioned sections may ensure that the boot loader routine remains unaltered during the configuration/upgradation process.

At step 306, contents of the first memory are erased except the contents of the boot sector. Further where an APU is a microcontroller, it is likely that some of interrupt vector tables (IVT) reside in first memory and may point to respective interrupt service routines (ISR). At step 308, IVT from the first memory are erased and a new IVT is written to direct interrupts pertaining to the communication link to the boot sector of the first memory. The ISR pertaining to the communication link interrupt normally resides in first memory (which has now been erased) and hence an alternate ISR location for these interrupts in the boot loader space is provided. The IVT which normally points to the ISR in the first memory may be made to point the ISR in the boot sector of the first memory. This makes it possible to service future interrupts from the communication link during the upgradation/configuration process. Further, the sector of the first memory containing IVT is erased and re-written with the alternate IVT locations for servicing the link-related interrupt/s. Subsequently at step 312, the MPU sends the address of the first memory location and then the data to be written into it, this process is repeated in such a way that each address is followed by a data byte (step 314) to be written into the preceding address. A person skilled in the art will appreciate that the data may also be written in the memory while following different set of steps. While writing each data byte into the first memory the APU suspends any further data transfer (step 316). At step 318 it is checked if binary data has completely received, if not, then the process of receiving data bytes is repeated (step 312 to 316). Once data has been received at step 322 the part of the configuration code, that may include new IVT, may be received in the second memory. The IVT may not be required to be received byte by byte unlike data that was received into the first memory. This is because if the IVT address related to the communication link interrupt is updated during the data transfer, the utility may fail, hence this is done by first transferring all the IVT related bytes (bulk transfer) through the link, storing it onto the second memory, then updating the common sector. At step 324 the IVT are updated. At step 328 it is verified whether configuration data has been written into the correct addresses. At step 330 normal operation of the APU is resumed.

The boot loader routine may be programmed by fixing addresses of the first line of code in the first memory to resume normal operation of the APU after the configuration process. In such case it may be required that the configuration code starts from the same memory address as fixed by the boot loader routine. Further the boot loader routine may also be upgraded while an application is running from the application sector. The method for configuration/updation of the boot loader routine is same as discussed earlier except that the application sector of the first memory is kept unaltered while the boot loader routine is being updated byte by byte.

This discussion provides a plurality of advantages for example, the method discussed above can be ported to any other variant of the specific (APU family) microcontroller family by minimal modification of the memory map in the code, so that the code resides at an appropriate location in the first memory/second memory. Besides, this mechanism is also independent of the type of main processor used in the system, the type of communication link and the (APU) microcontroller itself.

This method may not require an emulator or UART interface for configuring/updating/upgrading the APU as it lends itself to use the interfaces associated with the MPU and the connecting communication link. Due to this utility, the APU needs to be programmed through a programmer only once and thereafter it can be updated through the memory update mechanism discussed above. Further, for the multiprocessor systems that are provided with APUs having a boot loader routine in a dedicated memory (boot sector) or in the ROM along with a skeleton application, for such systems there is no need for the OEM (Original Equipment Manufacturer) to use a programmer even for the first time. This saves a key time-consuming activity in a production set up as well as real estate on the board since no external programming interface/connectors are required. Further, the method allows achieving a careful upgradation/configuration/updation of the APU, particularly when, the IVT region in the first memory is common to the application second and the boot sector by updating interrupt vector tables dynamically using a minimal second memory, so that link-related interrupts can be pointed to alternate ISR locations during the update process, and then updated again through bulk transfer at the end of the update process. Furthermore, the method also offers itself for multi-processor system where there may or may not be a single "MPUs", which have access to acquiring the reconfiguration data for the microcontroller, through user-friendly interfaces.

Figure 4:
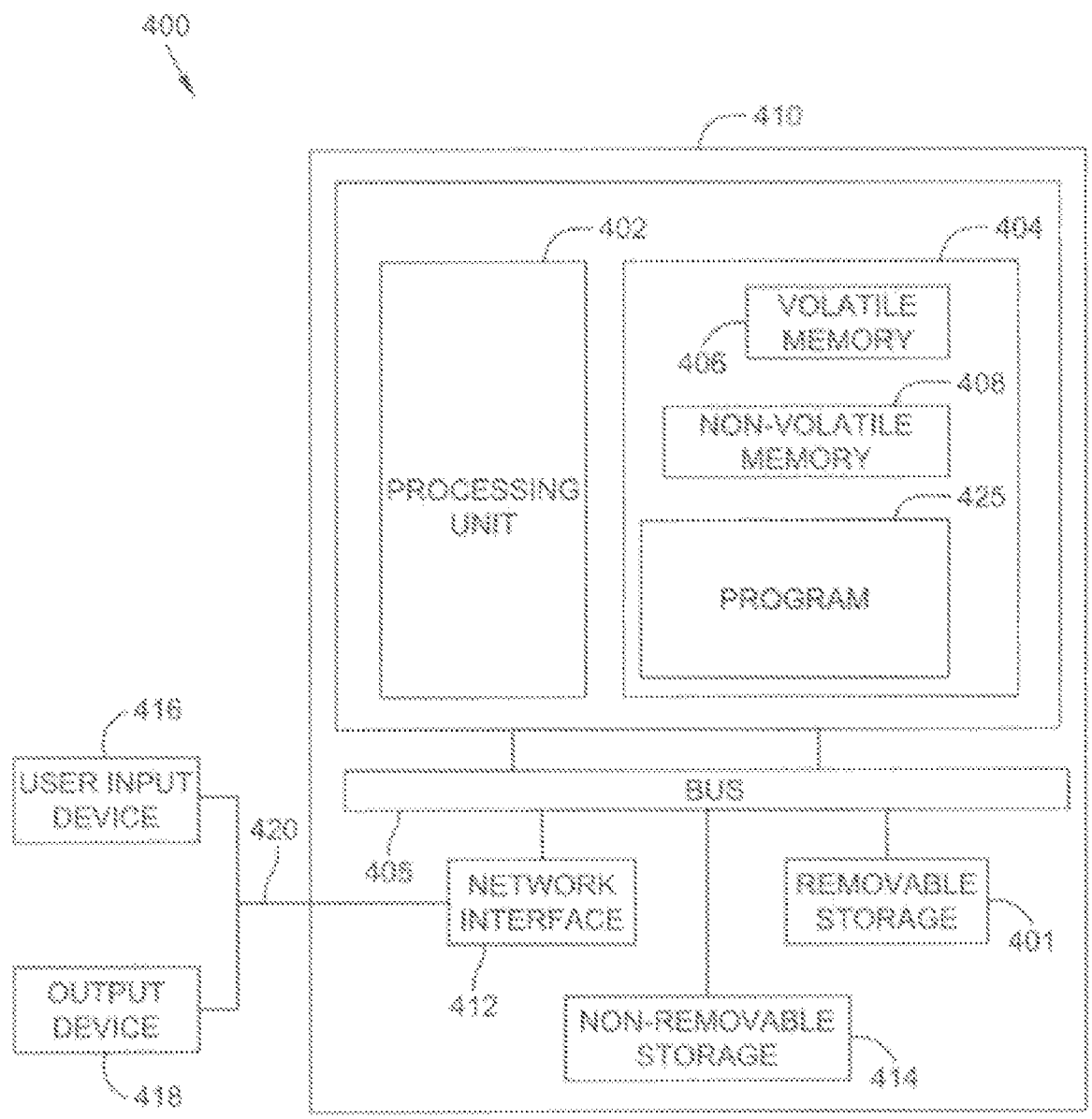
FIG. 4 is a computer system in accordance with the present subject matter.

FIG. 4 shows an example of a suitable computing system environment 400 for implementing embodiments of the present subject matter. FIG. 4 and the following discussion are intended to provide a brief, general description of a suitable computing environment in which certain embodiments of the inventive concepts contained herein may be implemented.

A general computing device, in the form of a computer 410, may include a processor 402, memory 404, removable storage 401, and non-removable storage 414. Computer 410 additionally includes a bus 405 and a network interface 412.

Computer 410 may include or have access to a computing environment that includes one or more user input devices 416, one or more output devices 418, and one or more communication connections 420 such as a network interface card or a USB connection. The one or more output devices 418 can be a display device of computer, computer monitor, TV screen, plasma display, LCD display, display on a digitizer, display on an electronic tablet, and the like. The computer 410 may operate in a networked environment using the communication connection 420 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 404 may include volatile memory 406 and non-volatile memory 408. A variety of computer-readable media may be stored in and accessed from the memory elements of computer 410, such as volatile memory 406 and non-volatile memory 408, removable storage 401 and non-removable storage 414. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 402 of the computer 410. For example, a program module 425 may include machine-readable instructions capable performing step according to above discussion. In one embodiment, the program module 425 may be included on a CD-ROM and loaded from the CD-ROM to a hard drive in non-volatile memory 408. The machine-readable instructions cause the computer 410 to encode according to the various embodiments of the present subject matter. The subject matter further teaches a computer readable medium that includes instructions for performing steps according to the present subject matter. The subject matter further provides an article that includes the computer readable medium according to present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods. Other embodiments will be readily apparent to those of ordinary skill in the art. The elements, algorithms, and sequence of operations can all be varied to suit particular requirements. The operations described-above with respect to the method illustrated in FIG. 2 and FIG. 3 may be performed in a different order from those shown and described herein.

FIGS. 1-3 are merely representational and are not drawn to scale. Certain proportions thereof may be exaggerated, while others may be minimized. FIGS. 1-3 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus, the following claims are hereby incorporated into the detailed description of the embodiments of the invention, with each claim standing on its own as a separate preferred embodiment.

What is claimed is:

1. A method for configuration of an Auxiliary Processing Unit (APU) of multiprocessor system, the multiprocessor system having at least a Main Processing Unit (MPU) coupled to the APU via a communication link, the APU has at least a first memory and a second memory, the method comprising steps of:

dividing the first memory into an application sector, a boot sector and a common sector;

receiving a command to initiate configuring the APU;

in response to the received command, disabling interrupts of the APU except interrupt(s) pertaining to the communication link;

mapping interrupt vector(s) pertaining to the communication link to the boot sector of the first memory;

receiving selectively a configuration code into the application sector of the first memory and into the second memory, wherein the configuration code is generated by a software compiler and is transferred to memory associated with the MPU, and wherein the configuration code is selectively received into the first memory and into the second memory of the APU from the memory associated with the MPU via the communication link;

disabling the interrupt(s) pertaining to the communication link; and updating the common sector of the first memory;

wherein the step of receiving selectively further includes the steps of:

receiving part of the configuring code pertaining to the application sector of the first memory into the application sector of the first memory; and receiving part of the configuration code pertaining to the common sector of the first memory into the second memory;

wherein the second memory is a scratchpad memory.

2. The method as claimed in claim 1, wherein the step of updating includes the steps of:

erasing contents of the common sector of the first memory; and copying contents of the second memory into the common sector of the first memory.

3. The method as claimed in claim 1, wherein the APU is a microcontroller.

4. The method as claimed in claim 1, wherein the APU is a microprocessor.

5. The method as claimed in claim 1, wherein the MPU is a microprocessor.

6. The method as claimed in claim 1, wherein the first memory is included within the APU.

7. The method as claimed in claim 1, wherein the first memory is an external memory usable by the APU.

8. The method as claimed in claim 1, wherein the second memory is included within the APU.

9. The method as claimed in claim 1, wherein the second memory is an external memory usable by the APU or is an unused for of the first memory.

10. The method as claimed in claim 1, wherein the MPU is a microcontroller.

11. A computer system comprising:

a processing unit; and a memory coupled to the processor, the memory having stored therein a code for performing steps of the method described in claim 1.

12. A non-transitory computer readable storage medium of having instructions that, when executed by a computer, causes the computer to perform the method of claim 1.

* * * * *

UNITED STATES PATENT AND TRADEMARK OFFICE
CERTIFICATE OF CORRECTION

PATENT NO. : 7,680,909 B2
APPLICATION NO. : 11/688884
DATED : March 16, 2010
INVENTOR(S) : Shantanu Prasad Prabhudesai et al.

It is certified that error appears in the above-identified patent and that said Letters Patent is hereby corrected as shown below:

Title Page item 73

The Assignee state should read as:

"Ittiam systems (p) Ltd., Bangalore, KARNATAKA" instead of "Ittiam systems (p) Ltd., Bangalore, KAMATAKA"

Signed and Sealed this

Fifteenth Day of June, 2010

David J. Kappos
*Director of the United States Patent and Trademark Office*